United States Patent [19]

Swearingen

[11] Patent Number: 5,112,634
[45] Date of Patent: May 12, 1992

[54] METHOD AND APPARATUS FOR MAKING GROUND MEAT PATTIES

[76] Inventor: Ralph M. Swearingen, 167 Foster Rd., West Union, Ohio 45693

[21] Appl. No.: 738,451

[22] Filed: Jul. 31, 1991

[51] Int. Cl.⁵ .............................................. A22C 7/00
[52] U.S. Cl. .................................. 426/513; 100/910; 452/174
[58] Field of Search ............... 426/513; 452/174; 249/74; 100/910; 99/349, 428

[56] References Cited

U.S. PATENT DOCUMENTS

| | | | |
|---|---|---|---|
| Re. 28,106 | 8/1974 | Lee | 100/910 |
| 1,950,763 | 3/1934 | Walter | 426/513 |
| 2,008,725 | 7/1935 | Parker | 249/74 |
| 2,081,080 | 5/1937 | Baker | 426/513 |
| 2,981,973 | 5/1961 | Elmore | 426/513 |
| 3,045,277 | 7/1962 | Carpenter | 425/357 |
| 3,863,020 | 1/1975 | Robinson | 426/513 |
| 4,106,162 | 8/1978 | Fournier | 426/513 |
| 4,192,899 | 3/1980 | Roth | 426/513 |

Primary Examiner—George Yeung
Attorney, Agent, or Firm—Frost & Jacobs

[57] ABSTRACT

A household hamburger maker is disclosed having a hollow, circular outer collar and a hand-held center plug. Ground meat is placed into the hollow area of the outer collar, and the center plug is inserted into the same hollow area and pressed down against the ground meat. While the center plug is being pressed down, it is also twisted alternately clockwise and counterclockwise, which produces a smooth top surface on the ground meat as it is shaped into a hamburger patty. While still being twisted, the center plug is pulled back up and away from the hamburger patty, leaving behind a correctly-shaped patty that has a smooth top surface.

10 Claims, 3 Drawing Sheets

METHOD AND APPARATUS FOR MAKING GROUND MEAT PATTIES

TECHNICAL FIELD

The present invention relates generally to hamburger makers and is particularly directed to hand-operated hamburger makers which can be used in the home. The invention will be specifically disclosed in connection with a two-piece apparatus which includes a hollow, round outer collar and a plug-type patty-forming center piece, which pushes the ground meat down and shapes the meat into a hamburger patty.

BACKGROUND OF THE INVENTION

An easy method of making hamburgers having relatively uniform thickness and smooth consistency is desirable, and has been achieved by use of automatic machinery in certain commercial settings. For example, in Roth U.S. Pat. No. 4,192,899, a method for forming frozen meat patties is disclosed having a continuously rotating refrigerated drum which moves an extruded ground meat product, then compresses and cuts the extruded meat into patties. A plurality of reciprocating cutters forms several patties at one time, then the patties are slid onto a conveyor belt and carried away to a packaging station. The waste meat sections between the cut patties are dropped onto another conveyor belt which returns the waste meat to be re-ground for reprocessing in the system. It should be noted that the pneumatically operated cutter has a concave lower surface which includes vacuum breaking holes that allow any vacuum that may form between the lower surface of the cutter and the hamburger to be vented, in order to assist in releasing the hamburger from the cutter lower surface. Such holes would likely become clogged on a regular basis (due to meat product residue clinging to the lower surface and thereby covering the holes), and would require constant cleaning and maintenance in order to keep the holes and their associated air flow paths clean enough to be effective.

It is obvious that the complexity and size of the machinery required to implement Roth is much too great to use in the home. The Roth apparatus requires not only a special air vent, but it calls for the introduction of compressed air into the mold if the meat patty does not initially release from the mold. In addition, the purpose of Roth is to freeze the meat as the machinery is forming the patties. A person making a hamburger patty in the home would likely be as interested in making non-frozen patties (for immediate consumption) as in making frozen patties. It is, therefore, clear that the Roth patent will not meet the requirements of a household hamburger maker.

Other devices in the prior art are available that could be used in the home, including devices disclosed in Parker U.S. Pat. No. 2,008,725, Baker U.S. Pat. No. 2,082,080, Carpenter U.S. Pat. No. 3,045,277, Lee U.S. Pat. No. 28,106, and Robinson U.S. Pat. No. 3,863,020. In Parker, a culinary mold is disclosed having a hand-held ejector in the form of a cruciform grid, which impresses a pattern in the molded article (such as ground beef). The cruciform grid has members which are very thin and touch the molded article with just a small amount of surface area. The grid acts to disengage the article from the mold, and by virtue of its touching the article at only a small surface area, the grid also disengages itself from the article with ease.

The Baker patent discloses an open meat patty mold that uses no press at all. The ground meat is packed into the mold manually, and a knife is then used to cut off the top surface of the meat, thereby leaving behind a circular patty. To disengage the patty from the mold, the mold is either turned upside down, or a knife is used to pop the meat out of the mold. Baker's apparatus is clearly a crude device having simplicity as its chief advantage.

In Carpenter, a ground meat mold is disclosed having six circular receptacles. Ground meat is pressed into each of the circular receptacle by use of a hand-held circular tool which is used to press the meat downward into the receptacles. To disengage the patty from each of the molds, the entire apparatus is either turned upside down, or a knife is used to pop the meat out of each of the molds. Carpenter's apparatus is, thus, similar to the above Baker apparatus, with the additional advantage of the hand-held circular tool which is used to press the meat down into a more cohesive patty.

The Lee patent discloses a food patty press which includes a vertical passageway, a bottom closure plate, and a plunger that can be rocked slightly as it is pushed down while forming a patty. After the plunger forms a patty, the plunger can be pulled back out of the vertical passageway in order to place a separator disk on top of the existing patty. Another portion of food can then be placed on top of the separator disk, the plunger reinserted into the vertical passageway, and a second patty formed on top of the first patty. Several patties can be formed within the vertical passageway in this manner, each having a separator disk adjacent to its surface. Later, all patties can be removed by opening the bottom closure plate and pushing down the plunger until all the patties are pushed out of the vertical passageway.

In Robinson, a method of preparing a meat product is disclosed wherein meat is pressed into a mold which has concentric circular grooves in its upper and lower portions. The lower portion is in the shape of a circular mold. In order to use this apparatus, the mold upper and lower portions are separated in order to place a plastic wrapping material across the lower portion, and to insert a ground meat product into the lower portion. The upper portion is then closed, and a handle on the upper surface of the upper portion is rotated to produce an "ironing" action, which compacts the meat within the grooves of the inner surfaces of the upper and lower portions. The meat patty thus created is formed with concentric grooves in its top and bottom surfaces. The plastic wrapping material which was placed across the lower portion is then pulled up and out of the lower portion, thereby removing the meat patty from the mold.

None of the above devices for use in the home provide means for cleanly separating the meat patty from the mold while retaining a smooth surface for the meat patty. As was noted in Roth, above, some means for relieving any vacuum that might form between the molded meat patty and the mold surface is desirable, in order to achieve a clean separation of the meat patty from the molding apparatus. In Roth, vacuum breaking holes were provided, and compressed air could additionally be introduced through other holes, if necessary, in order to achieve the desired clean separation. A system such as Roth, however, as noted above, simply is not practical for use in the home.

One of the above devices for the home allows for a clean separation of the meat patty from the mold, but does not provide for a smooth patty surface. The Parker apparatus includes a cruciform grid made up of relatively thin elements which allow the existence of plenty of air space within the mold which eliminate the possibility of the forming of any vacuum that might cause the meat patty from failing to easily release from the mold. On the other hand, the meat patty produced by Parker would not be smooth, but would have the pattern of the cruciform grid impressed into its surface.

The other above devices for the home do not include means for insuring a clean separation of the meat patty from the mold. The Baker and Carpenter devices require gravity, possibly with the assistance of a knife to pry out the meat patty, to cause the meat patty to disengage from the mold. Unless the mold surfaces were made of a "no-stick" surface, which is not taught by these references, the meat patty will not come out of the mold having a smooth surface. The Lee apparatus may not require a knife in order to separate the meat patty from the mold, however, neither does it provide a means to eliminate any vacuum build up that would form between the plunger and the meat patty, or between a separator disk and the meat patty. In other words, Lee does not teach a means for insuring that the meat patty will have a smooth surface. Robinson teaches a method of making meat patties that have concentric circular grooves in their top and bottom surfaces, so it is evident that Robinson does not teach a means for insuring that a meat patty will have a smooth surface.

It is desirable to make meat patties that have smooth surfaces after they are formed in the mold. This desire is provided for in the industrial apparatus disclosed in Roth, but not in any of the above references that are suitable for use in the home.

SUMMARY OF THE INVENTION

Accordingly, it is a primary object of the present invention to provide an economical hamburger patty-making apparatus that can easily be used in the home which provides means to insure that the molded meat patty will have a smooth surface as it is released from the apparatus.

It is another object of the present invention to provide a household hamburger patty maker which does not rely upon the existence of air holes in the surface of the mold face, which would allow air to enter the surface area of the mold face if a vacuum would form in that area, in order to allow the molded meat patty to easily disengage from the mold face.

It is yet another object of the present invention to provide a household hamburger patty maker which furnishes a simple, easy to clean mold face surface.

It is a further object of the present invention to provide a household hamburger patty maker which can be easily handled by persons of normal strength and manual dexterity, and is used simply by turning a center piece while pushing it down against the ground meat.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved household hamburger maker is provided having a round outer collar portion that is hollow in its center, and a center plug-type portion which fits inside the hollow area of the collar. The face of the center plug that touches the ground meat has a concave face with small dimples which protrude from the face of the ground meat.

According to a further aspect of the invention, the center plug of the hamburger maker has a tapered outer diameter, wherein its maximum outer diameter is at its lowest point (nearest to the ground meat), so as to make it relatively easy to press the center plug down inside the hollow area of the collar, and then later to remove it from the center of the collar. The tapered outer diameter reduces friction between the center plug and the collar.

In accordance with a further aspect of the invention, after ground meat is placed into the open center of the collar, the center plug is pressed down on top of the ground meat and slowly turned back and forth (clockwise and counterclockwise) in order to flatten the ground meat and impart a smooth onto the ground meat. To release the center plug from the ground meat, the center plug is turned in one direction only (either clockwise or counter-clockwise) while being slowly lifted away from the ground meat, thereby leaving behind the flattened ground meat which is now in the form of a hamburger patty, and further which has a smooth surface.

In accordance with yet another aspect of the invention, the dimples that protrude from the center plug concave face are sized, shaped, and spaced apart from one another so as to flatten a piece of ground meat and impart a smooth surface onto the ground meat by trapping a small amount of air between the ground meat and the concave face portions which do not contain dimples. Once the ground meat has been formed into a patty, the dimples allow for a smooth separation of the center plug from the ground meat, thereby leaving the smooth surface of the ground meat intact.

According to another aspect of the invention, the hollow collar is open at its bottom so that, once the ground meat has been formed into a meat patty, the collar can be manually picked up off the working surface, thereby leaving behind the meat patty.

Still other objects of the present invention will become apparent to those skilled in this art from the following description wherein there is shown and described a preferred embodiment of this invention, simply by way of illustration, of one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description serve to explain the principles of the invention In the drawings.

DESCRIPTION OF THE PREFERRED EMBODIMENT

Reference will now be made in detail to the present preferred embodiment of the invention, an example of which is illustrated in the accompanying drawings, wherein like numerals indicate the same elements throughout the views.

Figure 1:
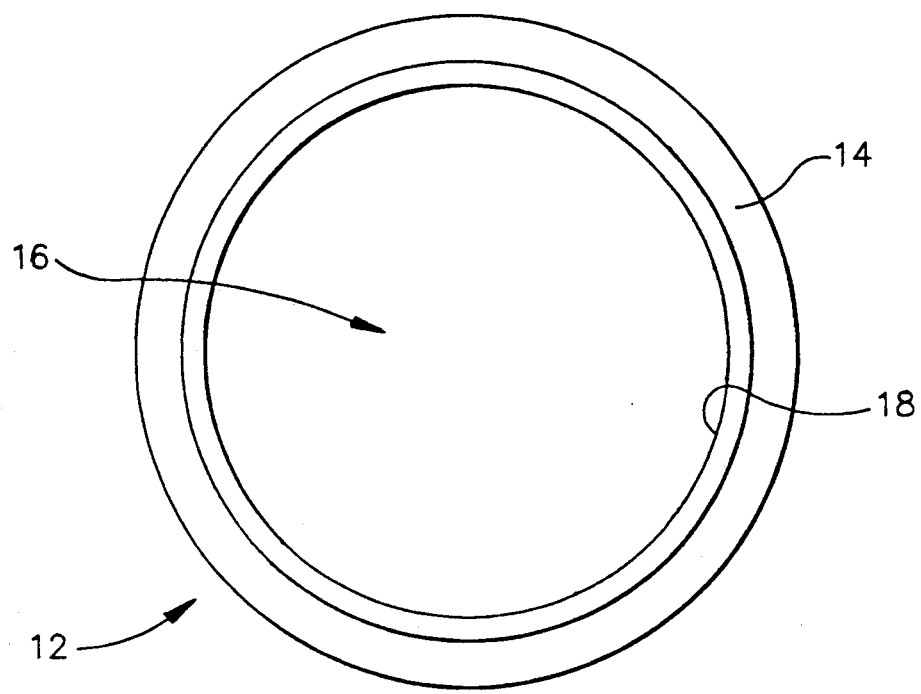
FIG. 1 is a top plan view of a round outer collar built in accordance with the present invention.

Referring now to the drawings, FIG. 1 shows the outer collar 12 of a household hamburger maker 10 constructed in accordance with the principles of the present invention. The outer collar 12 is generally circular in shape, and is hollow in the area of its center portion, which is depicted by the numeral 16. The outer collar 12 has a grip ring 14, which is used to hold the outer collar 12 in place by a person's hand during the forming of a hamburger patty. The hollow area 16 of the outer collar 12 is bounded by an inner diameter surface 18.

Figure 2:
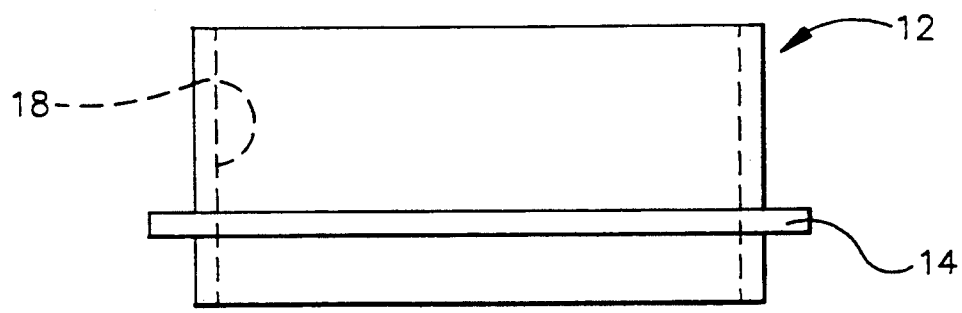
FIG. 2 is a front side elevational view of the round outer collar of FIG. 1.

FIG. 2 shows the same construction details of the outer collar 12 as does FIG. 1, except FIG. 2 is an elevational view. As can be seen in FIG. 2, the grip ring 14 of the outer collar 12 is not in the middle of the vertical dimension of outer collar 12, but is closer to the bottom of the outer collar 12. If desired by the user of household hamburger maker 10, the outer collar 12 can be flipped upside down so that the grip ring 14 is higher, closer to the top of the outer collar 12 rather than closer to the bottom of outer collar 12. Outer collar 12 is preferably constructed of a plastic-type material, such as nylon or delrin.

Figure 3:
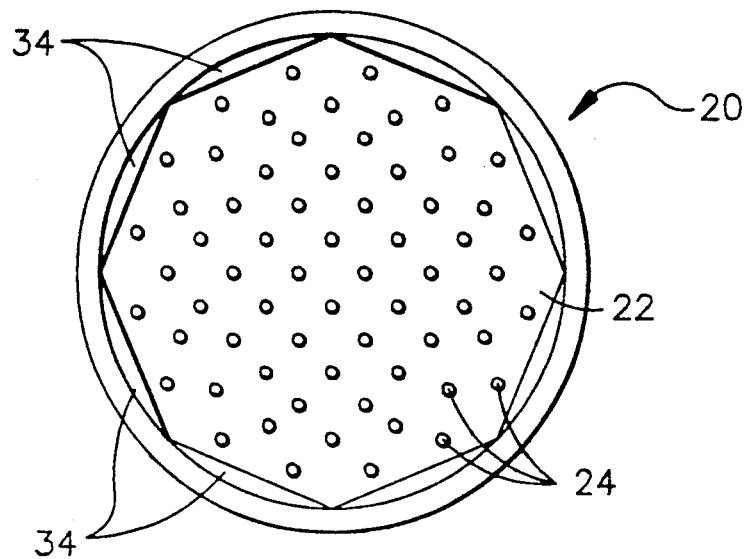
FIG. 3 is a bottom view of a center plug built in accordance with the present invention.
Figure 4:
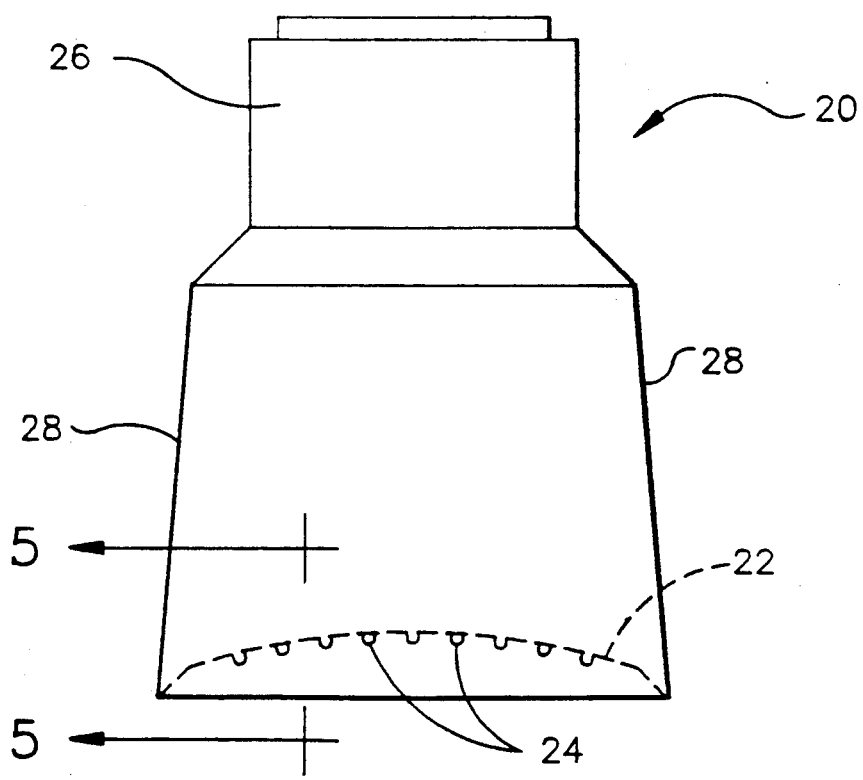
FIG. 4 is an elevational view of the center plug of FIG. 3.

The center plug 20 is depicted in FIGS. 3 and 4, FIG. 3 being a bottom view of the center plug 20, and FIG. 4 being an elevational view. As seen in FIG. 3, the sheet metal face 22 of the center plug 20 has many dimples 24 formed in the surface of the sheet metal face 22. The dimples 24 protrude outward, away from the main body of the center plug 20. Sheet metal face 22 is preferably made of stainless steel, however, any type of smooth material which can be formed with dimples in its surface could be used.

The elevational view of FIG. 4 shows the overall shape of center plug 20. FIG. 4 also depicts the concave shape of sheet metal face 22, and the dimples 24 which protrude from the surface of sheet metal face 22. Except for the sheet metal face 22, center plug 20 is preferably made of a plastic-type material, such nylon or delrin.

The lower portion of center plug 20 is circular, having tapered outer diameter sides 28 for ease of pushing the center plug 20 down through the hollow inner diameter of the outer collar 12. The tapered sides 28 of center plug 20 also assist in pulling the center plug 20 back out of the hollow area 16 of the outer collar 12. At its greatest outer diameter, which is at its bottom portion, center plug 20 just fits inside the inner diameter surface 18 of outer collar 12. This is so that the meat product being formed into a patty will not slip around the outer diameter portion of center plug 20. In addition, the outer diameter edge 36 of center plug 20 helps to retain the meat product within the confines of the bottom sheet metal face 22 of center plug 20.

The top portion of center plug 20 is identified in the drawings by the numeral 26. Top portion 26 is made to fit the palm of a human hand, so that the user's hand can press down on the top of center plug 20, and also the fingers of the user's hand can be placed around the outer diameter of top portion 26 of center plug 20. In this way, the human user can twist center plug 20 both left and right (clockwise and counterclockwise), alternately, while forming a meat patty.

Figure 5:
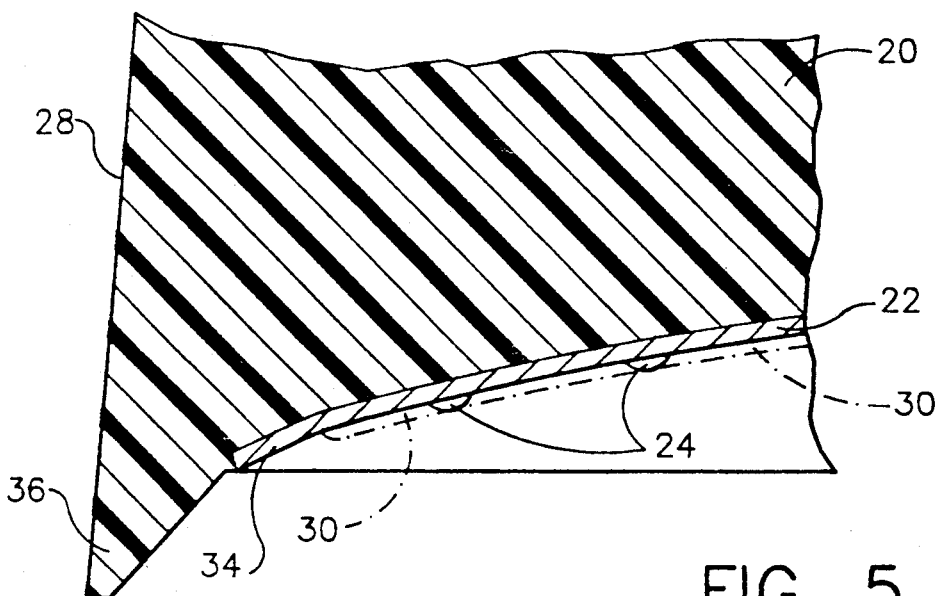
FIG. 5 is a magnified cross-sectional view of the center plug of FIG. 4, taken along the lines 5—5.

A magnified view of the sheet metal face 22 and its dimples 24 is depicted in FIG. 5. As can be seen in FIG. 5, the dimples 24 are smooth and do not protrude greatly away from the surface of sheet metal face 22. The purpose of the dimples is to help to form a smooth surface in the meat patty 40, and to create a small air pocket 30 between the top surface 42 (see FIG. 6) of meat patty 40 and the sheet metal face 22, during the process step wherein the meat patty 40 is being formed. This air pocket 30 will be formed between top surface 42 and sheet metal face 22 due to the twisting action, alternatively clockwise and counterclockwise, of the center plug 20 while center plug 20 is being pressed down against the meat patty 40 being formed. The dimples 24 tend to push the top surface 42 of meat patty 40 down, yet leave some space for an air pocket 30 to remain between top surface 42 and sheet metal face 22.

Sheet metal face 22 also includes eight folds 34 around its circular outer edge. The folds 34 are slight bends in the sheet metal at an angle of about 5 to 10 degrees. The folds 34 are alternately bent up (away from the meat patty) then down (toward the meat patty) so as to assist in forming the shape of the meat patty (the down folds), and then, to alternately assist in releasing sheet metal face 22 from the top surface 42 of meat patty 40 (the up folds). Sheet metal face 22 is attached to the remainder of center plug 20 by an adhesive, preferably epoxy.

Figure 6:
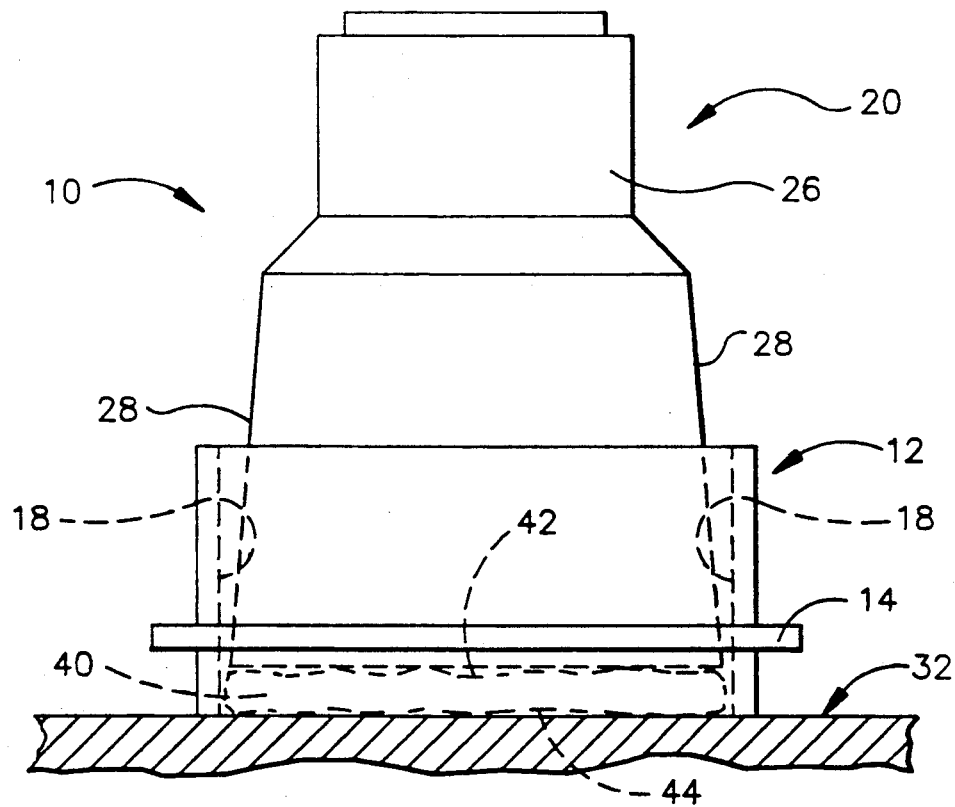
FIG. 6 is an elevational view of the entire household hamburger maker apparatus as it is forming a hamburger patty.

FIG. 6 illustrates the entire household hamburger maker device 10 in one view, with center plug 20 in place inside the inner diameter surface 18 of outer collar 12. As can be seen, meat patty 40 is formed as the center plug 20 is both pushed down and twisted alternately clockwise and counterclockwise. Household hamburger maker 10 rests on top of a flat surface, such as a bench or a table top, depicted by the numeral 32. The steps necessary to form a meat patty are as follows:

(1) Place the household hamburger maker 10 onto a flat surface 32.
(2) Remove center plug 20 from the hollow area 16 of the outer collar 12.
(3) Insert the desired amount of ground meat into the hollow area 16 of outer collar 12.
(4) Place the center plug 20 inside the hollow area 16 of outer collar 12 and on top of the ground meat that was previously placed into that hollow area 16.
(5) While holding the outer collar 12 by its grip ring 14, push down and twist the center plug 20, thereby forming meat patty 40.
(6) While still twisting until it is no longer in contact with the top surface 42 of the meat patty 40, remove center plug 20 from the hollow area 16 of outer collar 12.

(7) Pick up outer collar 12 off of the table top 32.

(8) The meat patty 40 is now laying by itself on the table top 32. Pick up meat patty 40 and place it in cookware or in a container for freezing.

It is obvious that various thicknesses of meat patties can be made by use of the above described embodiment of this invention. In order to make a thicker meat patty 40, the user simply adds more ground meat than normal during step (3), above. While pushing the center plug 20 down in step (5), above, the user will feel resistance from the ground meat, and can easily determine at what point he has pushed down far enough.

It may be helpful to place a sheet of wax paper on top of table top 32 before placing outer collar 12 onto table top 32, and before placing ground meat in the hollow area 16 of outer collar 12. If wax paper is used, the bottom surface 44 of meat patty 40 will be assured to have a smooth surface. In addition, after the patty forming operation has been completed and the center plug 20 and outer collar 12 have been removed from table top 32, the meat patty 40 can be easily removed from table top 42 by picking up the wax paper sheet.

In summary, numerous benefits have been described which result from employing the concepts of the invention. The household hamburger maker allows a human user to employ a simple method of making smooth-surfaced hamburger patties, with repeatable results. The household hamburger maker is of simple construction, having two major pieces, a circular, hollow outer collar and a center plug. In addition to the device itself being of simple construction, the method used by the human user is equally simple in concept. The user simply places ground meat into the hollow area of the outer collar, then places the center plug on top of the ground meat while pushing down and twisting the center plug, thus forming the desired sized and shaped hamburger patty. While still twisting the center plug, the user pulls it back upward which separates the center plug from the top surface of the hamburger patty. After that step, the outer collar itself is removed, thus leaving the hamburger patty behind for use, as desired.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

I claim:

1. A method for making ground meat patties having smooth surfaces, comprising the steps of:
   (a) placing a hollow, round outer collar on a flat surface;
   (b) placing a quantity of ground meat into the hollow portion of said round outer collar;
   (c) placing a center plug with a concave end surface containing protruding dimples into the hollow portion of said round outer collar;
   (d) pressing said center plug down so as to engage the ground meat with said protruding dimples while turning the plug alternatively clockwise and counterclockwise, shaping the ground meat into a patty which has a smooth upper surface; and
   (e) removing the center plug from the ground meat while turning the plug, so as to cleanly separate the plug from said patty such that the patty retains its smooth upper surface.

2. A method for making ground meat patties as recited in claim 1, further comprising the step of removing said round outer collar from the flat surface while leaving the patty on the flat surface.

3. A method for making ground meat patties as recited in claim 1, wherein the placing of said center plug into the hollow portion of said round outer collar and the pulling of the center plug out of the hollow portion of the round outer collar are facilitated by a tapered outer diameter of said center plug.

4. An apparatus for making ground meat having smooth surfaces, comprising:
   (a) a collar, said collar having an internal cylindrical surface extending between first and second oppositely disposed open ends and defining a cavity there between, the first open end being adapted to engage a substantially planar surface; and
   (b) a center plug having first and second ends, the first end being dimensioned and configured for entry into the cavity of the collar through the second open end, the first end of the plug having a cylindrical peripheral surface and a concave end surface, the peripheral surface of the first plug end having a diametral dimension approximately equal to the internal cylindrical dimension of the collar, and the first end surface having a plurality of outwardly extending dimples, whereby the plug may be inserted into the collar and pressed against ground meat contained in the collar cavity between the plug and a planar surface engaged by the first open end of said collar.

5. An apparatus for making ground meat patties having smooth surfaces as recited in claim 4, wherein said collar includes a grip ring.

6. An apparatus for making ground meat patties having smooth surfaces as recited in claim 4, wherein said collar is open at the bottom.

7. An apparatus for making ground meat patties having smooth surfaces as recited in claim 4, wherein said center plug includes a tapered outer diameter.

8. An apparatus for making ground meat patties having smooth surfaces as recited in claim 4, wherein said center plug includes a hand held portion at its second end.

9. An apparatus for making ground meat patties having smooth surfaces as recited in claim 4, wherein said concave end surface of the center plug is made from metallic material.

10. An apparatus for making ground meat patties having smooth surfaces as recited in claim 4, wherein said outwardly extending dimples of the concave end surface of the center plug are sized, shaped, and spaced apart from one another so as to facilitate, while the center plug is being spun clockwise and counterclockwise, the flattening of ground meat, and imparting a smooth surface onto the ground meat by trapping a small amount of air between the ground meat and portions of said concave end surface which do not contain dimples.

* * * * *